June 24, 1969
C. J. BRYSON
3,451,350
AUTOMATIC CONVEYOR SYSTEM
Filed May 19, 1967
Sheet 2 of 5
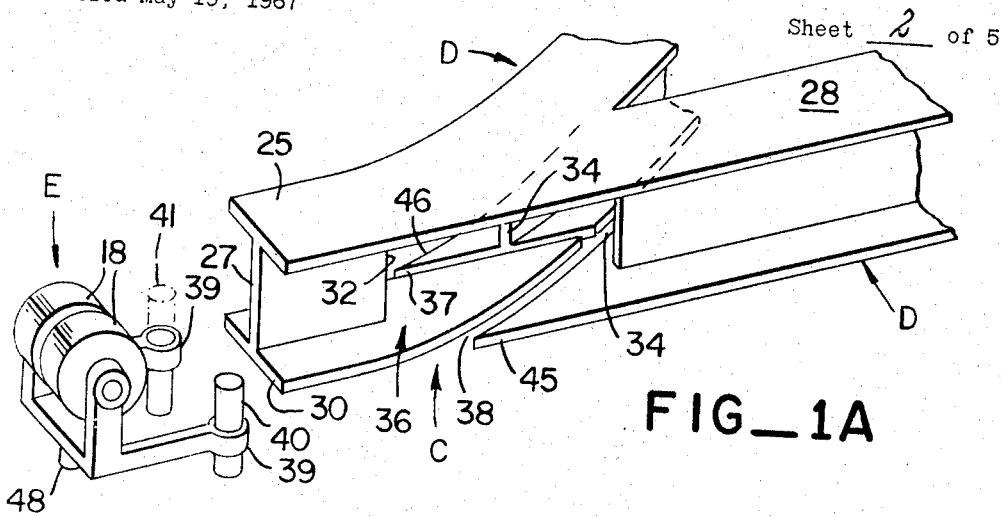
FIG_1A
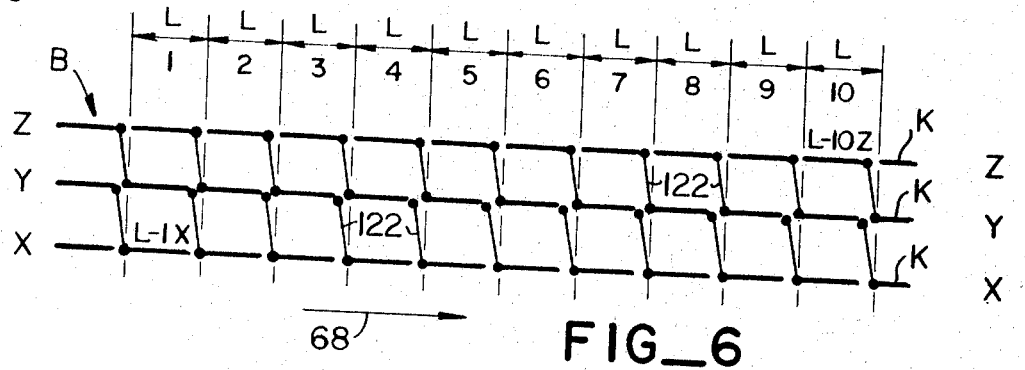
FIG_6
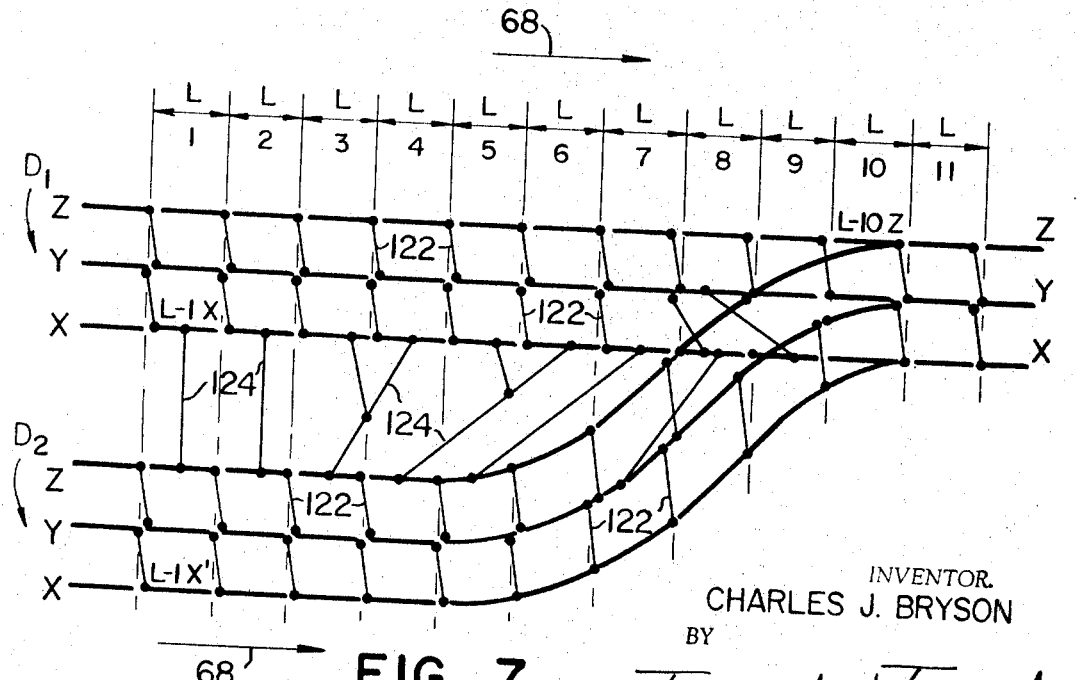
FIG_7
INVENTOR.
CHARLES J. BRYSON
BY
Townsend and Townsend
ATTORNEYS

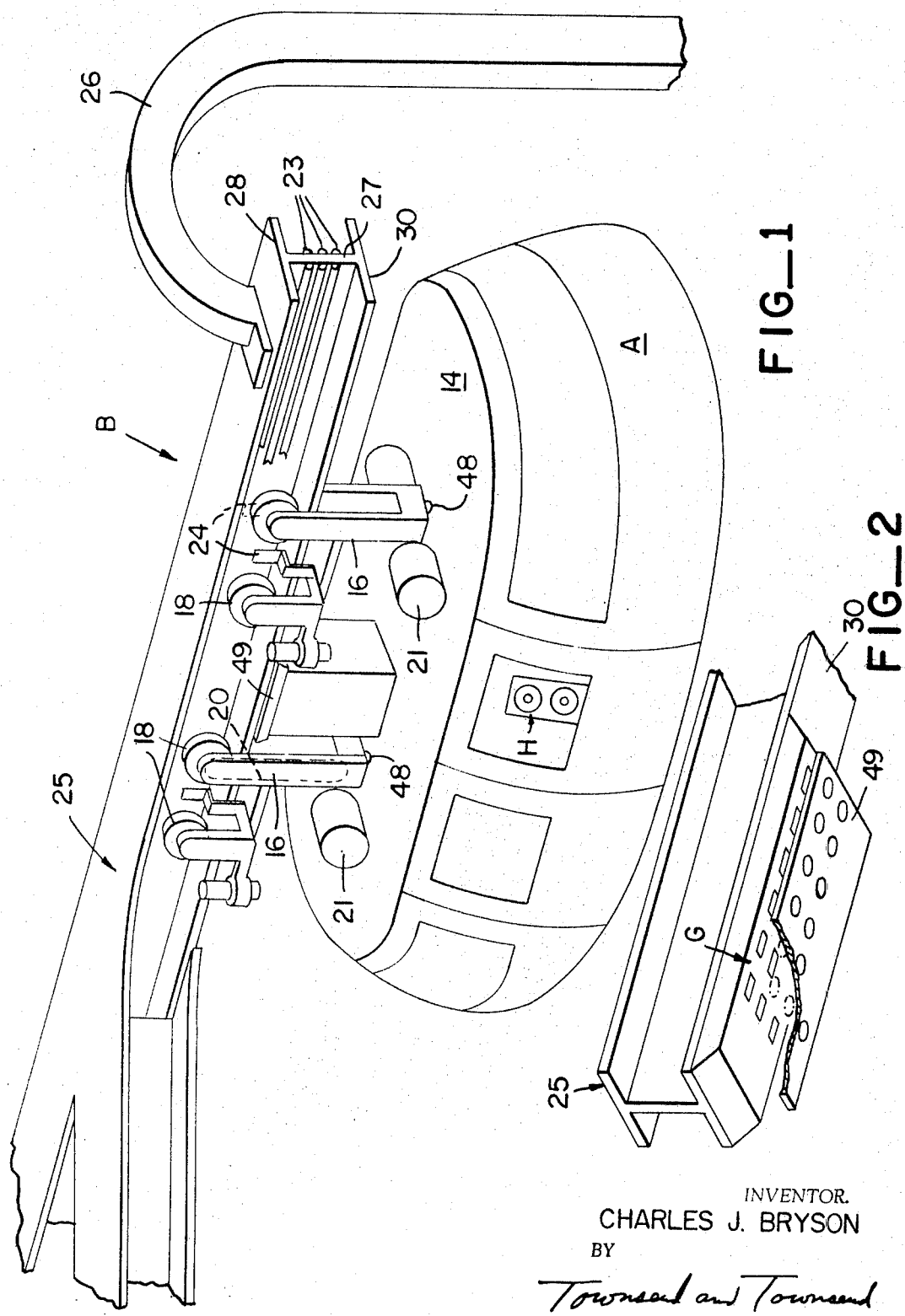

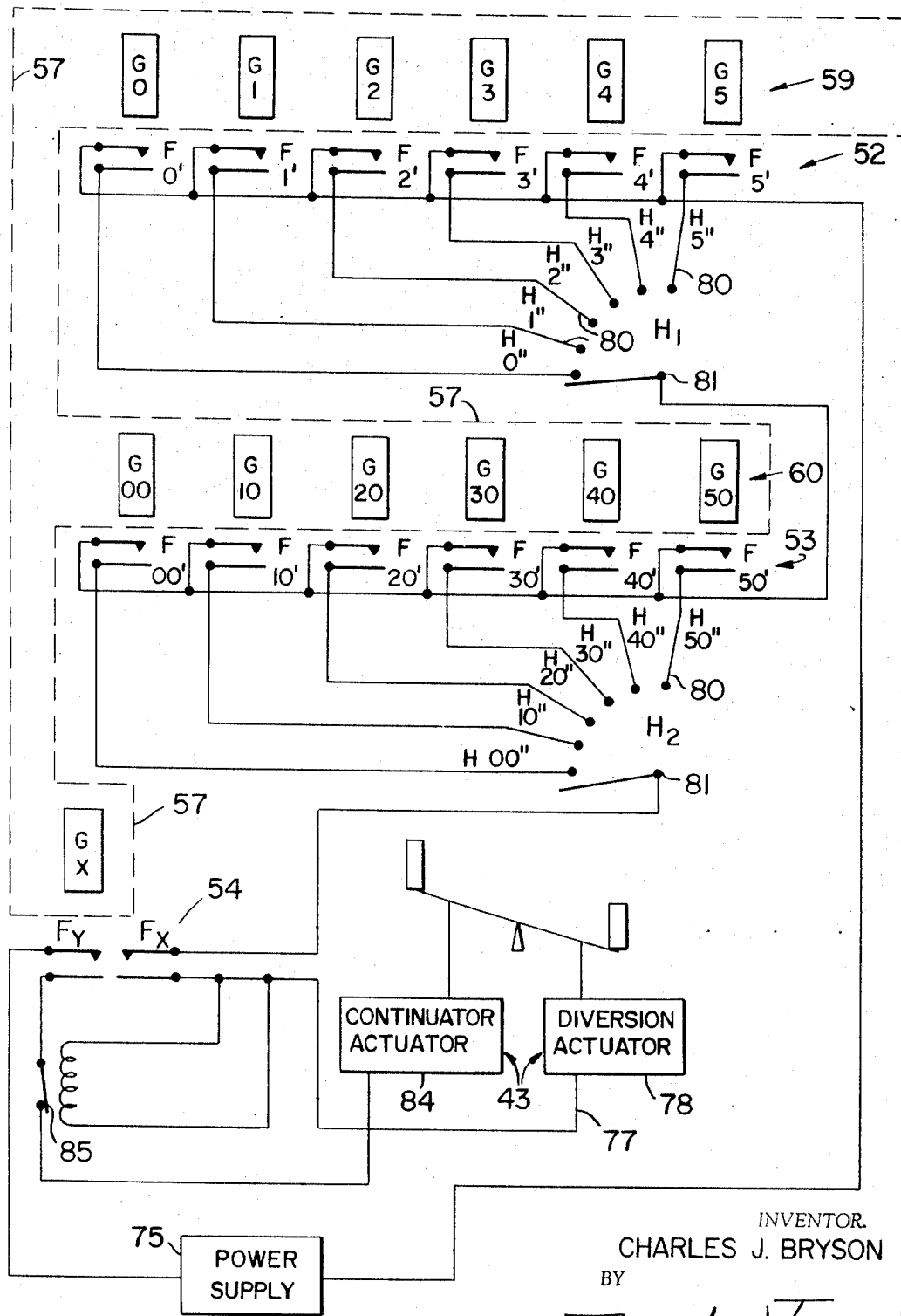
FIG_3

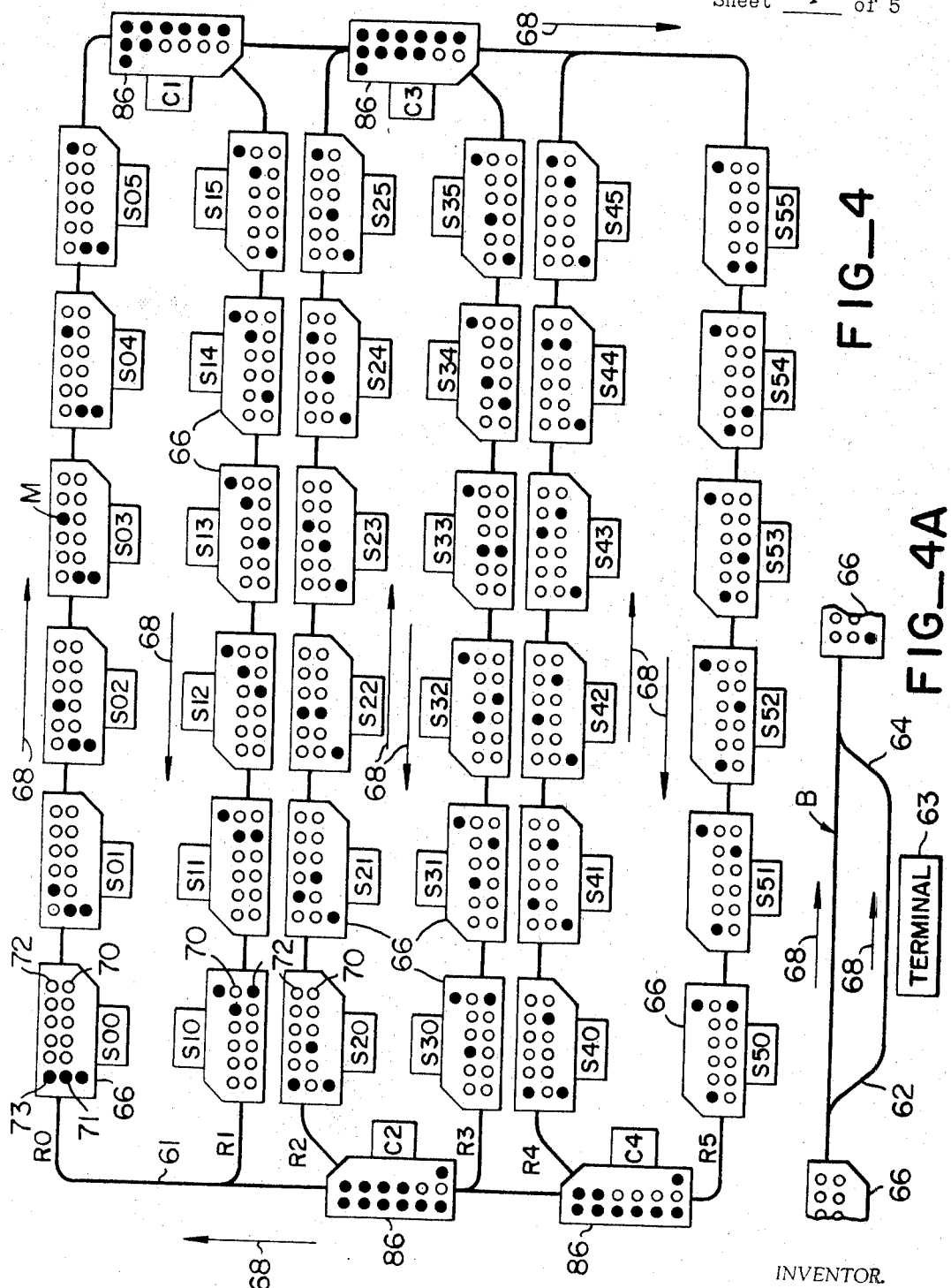

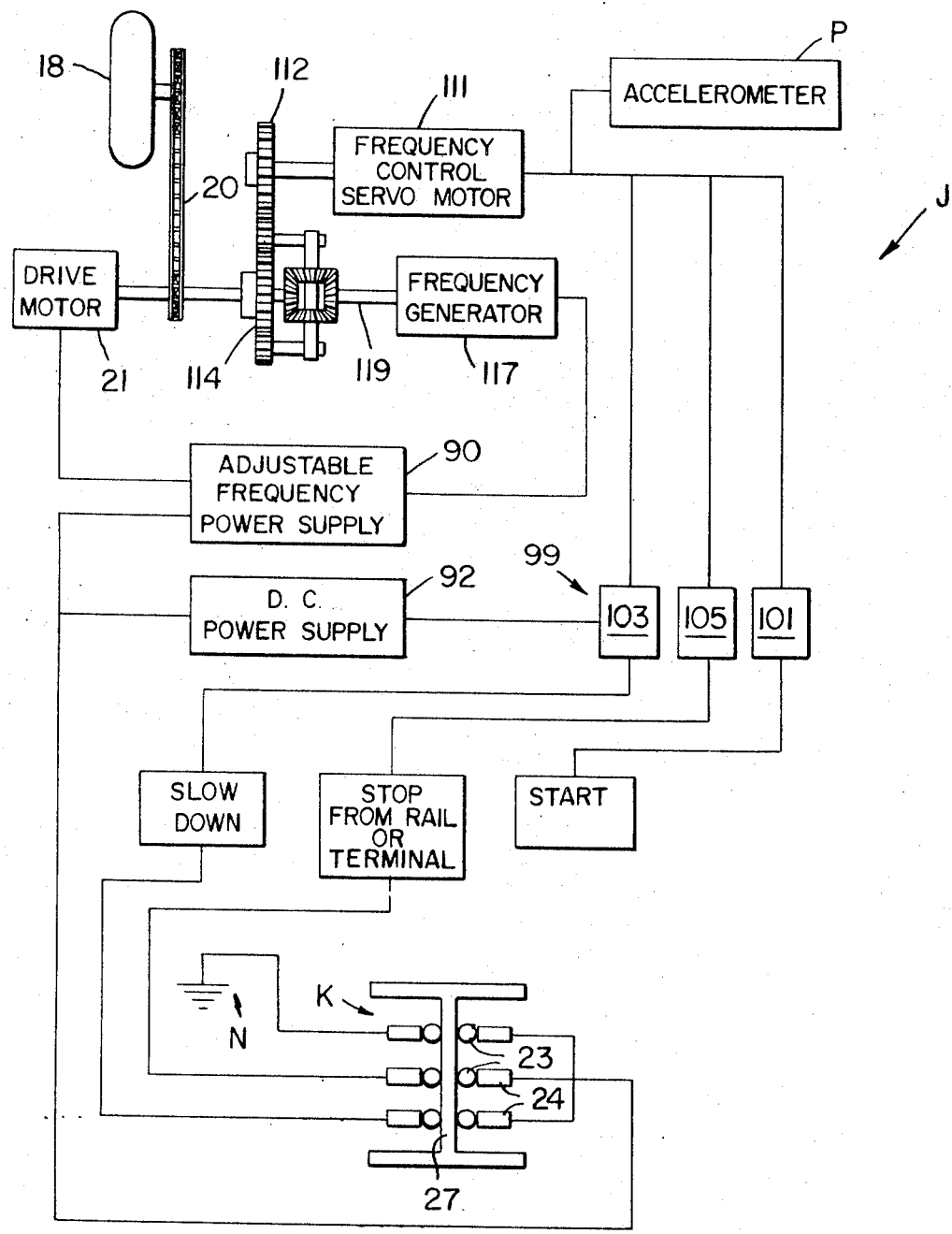
FIG_5

# United States Patent Office 3,451,350
Patented June 24, 1969

3,451,350
AUTOMATIC CONVEYOR SYSTEM
Charles J. Bryson, 611 San Luisito Way,
Sunnyvale, Calif. 94086
Continuation-in-part of application Ser. No. 439,525,
Mar. 11, 1965. This application May 19, 1967, Ser.
No. 639,910
Int. Cl. B61b *13/06, 1/02;* B61l *3/00*
U.S. Cl. 104—88                  10 Claims

ABSTRACT OF THE DISCLOSURE

A conveyor system for the selected transport of a plurality of vehicles on a supporting path between multiple stations. The conveyed vehicles and supporting path are equipped with mutually co-acting directing and identifying apparatus for sequentially accepting information descriptive of one station, choosing one route along the supporting path from multiple available routes to the described station, and finally distinguishing or identifying with the designated station so as to actuate the vehicle upon arrival. Integrated with this directing and identifying apparatus is a proximity sensing system attached to the conveyed vehicles and supporting path which when coupled to the conveyance apparatus prevents and arrests any tendency of the individually conveyed vehicles to collide or otherwise interfere with one another.

---

The present application is a continuation-in-part of co-pending application for U.S. Letters Patent Ser. No. 439,525 filed Mar. 11, 1965 and now abandoned.

This invention relates to a conveyor system having multiple vehicles thereon, each vehicle being capable of accepting a directed destination or station and choosing a route to that station while simultaneously remaining free and clear of the other conveyed vehicles on a common supporting path.

The chief object and purpose of the present invention is to provide an integrated conveyor system which is adapted to selectively and randomly transport human passengers through a network of available routes interconnecting multiple stations or points. This disclosure contemplates providing a modern metropolitan area with a common supporting path co-extensive with and conforming to the preexisting streets and intersections serving to interconnect the principle buildings, parking lots and terminals therein.

Conveyor systems are already known which have apparatus contained therein for diversion of conveyed articles to a preselected destination along a single available route on a supporting path. These systems typically imprint indicia representative of an intended destination on a memory device attached to a conveyed vehicle which is subsequently detoured or switched from the supporting path at its destination by apparatus which identifies or distinguishes the recorded indicia representative of the selected destination. Such systems, while being generally satisfactory for automated article handling interior of a factory, terminal or other similar facility, are wholly unsuitable for adaptation to the complexities of a modern metropolitan area.

The metropolitan area, as compared to the factory or terminal, has a pre-existing network of available routes in the form of streets and intersections interconnecting its buildings, parking lots, and terminals. A human passenger, desiring conveyance from one point in such a network to another point, wants not only to select his destination but also to discriminate between the multifarious available routes to choose the most expeditious and least time consuming path. A single path conveyor system could not service such an area as the route between many points would be unduly circuitous making impossible efficient transport.

Accordingly, an object of this invention is to provide a conveyor system for the selected transport of a conveyed vehicle to a given point or station along a single route selected from a plurality of available routes to that destination. A conveyed vehicle is transported along a common supporting path such as an overhead monorail. Mutually co-acting switching apparatus, in the form of specialized guides attached to the conveyed vehicle and guiding on the supporting path selects a designated route from alternate available routes along the supporting path at the various junctions encountered during the transport. This switching apparatus in turn is connected to a sensing apparatus, which is set to identify or distinguish indicia representative of the selected point or station. Specific designation apparatus, typically including small transmitters configured in preselected geometrical configurations, is located along the supporting path at the destination for displaying indicia identifying the selected point or destination to the passing vehicle through the attached sensing apparatus. Bulk designation apparatus, similar to the specific designation apparatus having second indicia for identifying and designating a route to the selected station is placed proximate the junctions along the supporting path. This second indicia is designed so as to include the first indicia of all destinations available along a designated route, enabling the conveyed vehicle to utilize the identical sensing apparatus to both select the designated route to the given destination and identify the selected point or station upon arrival.

A further object of this invention is to provide a conveyor system having a plurality of conveyed vehicles with a sensing system wherein a first vehicle closing its proximity to second vehicle along the supporting path will sense the proximity of the vehicles at a preselected spacial interval and avoid interference or collision. The common routes along the supporting path of the conveyor system are each provided with control sections at preselected spacial intervals. Conductive elements on each control section are insulated from one another and placed in aligned rows with other conductive elements on adjacent control sections so as to form a plurality of rows along the common route. A first conductive element in a first row on each sequential control section is in electrical communication with a second control section on a second row in an adjacent control section. Mutually co-acting proximity sensing apparatus are attached to all conveyed vehicles conveyed along the common route and communicate through the conductive elements in electrical communication giving a proximity signal to a vehicle entering one control section when a vehicle is on the adjacent control section. This proximity signal may then be utilized to vary the speed of the conveyed vehicles relative to one another so as to avoid collision or interference.

An advantage of the disclosed system is that the speed and location of the individual conveyed vehicles along the supporting path are not controlled by a central computer. As is apparent, failure of such a computer would affect all vehicles along the supporting path with catastrophic results. To avoid this undesired result, each conveyed vehicle is provided with its own routing mechanism as well as a mechanism for avoiding the proximity of other simultaneously conveyed vehicles. This integration of speed controls and routing mechanisms interior of the conveyed vehicles permits each car to operate independently of the remaining cars thereby preventing disablement of the entire system through the failure of any one given part thereof.

Other objects, features and advantages of the present invention will be more apparent after referring to the following specification and attached drawings in which:

FIG. 1 is a perspective view of a conveyed vehicle adjacent a junction illustrating portions of the switching apparatus and spacing apparatus attached to the vehicle and supporting paths;

FIG. 1a is a perspective view of the switching apparatus;

FIG. 2 is a perspective view of the designation apparatus attached to the supporting path with a representation of the passing sensing apparatus reading head in the sensing position;

FIG. 3 is a schematic representation of the sensing apparatus with the included designation apparatus schematically shown in the position of sensing;

FIG. 4 is a schematic representation illustrating the attachment of the specific designation apparatus at each station together with the bulk designation apparatus at each junction;

FIG. 4A is a detail of FIG. 4 illustrating schematically a station or terminal along the supporting path;

FIG. 5 is a block diagram of the spacing apparatus attached to the conveyed vehicle;

FIG. 6 is a schematic diagram illustrating the placement of the control sections and conductive elements along a route of the supporting path; and, FIG. 7 is a schematic representation of the control sections adjacent a point of interference along said supporting path.

With specific reference to FIG. 1, the conveyed vehicle A is shown having a cab 14 suspended by support arms 16 from supporting path B. Support arms 16 extend upwardly from cab 14 on opposite sides of the supporting path B and have path rollers 18 rotatably mounted at the ends thereof. These rollers extend centrally so as to roll on the bottom web of the supporting path.

Vehicle A is propelled by drive linkage 20 powered by motors 21 mounted on the top portion of cab 14. Electrical energy necessary to drive motors 21 is furnished by the sliding engagement with energized power rails 23 of sliding contacts 24 attached to vehicle A.

The preferred embodiment of supporting path B here comprises overhead I-beam monorail 25 supported at intervals by arch supports 26. I-beam 25 comprises a central channel 27 interconnecting a structural top web 28 and a load carrying bottom web 30. Vehicle A is transported along monorail 25 by having inwardly depending path rollers 18 roll on and engage the upper surface of bottom web 30. Support arms 16 span either side of the monorail 25 while inwardly depending path rollers 18 are restricted in rotatable engagement with bottom web 30 by the dividing central channel 27.

Conveyed vehicle A is shown supported by two pairs of opposing supporting arms 16 with path rollers 18. As is apparent, the number of supporting arms 16 and path rollers 18 may be varied as the weight and length of the conveyed vehicle changes.

Supporting path B is illustrated at junction C where alternate available routes D become available to the conveyed vehicle A. Central channel 27 is cut away at the beginning of junction C along channel termination 32 and is restored outside of junction C at channel continuation 34 on each of the respective diverging routes D. Expanded bottom web 36 provides a supporting path for rollers 18 along either of the diverging routs D. As each path roller 18 has a depending support arm 16 extending on either side of monorail 25, expanded bottom web 36 must be configured with slots therein so that the opposing support arms 16 can pass on either side of a selected diverging route D. Accordingly, if vehicle A continues on supporting path B in a straight line, continuation arm slot 37 provides a path through expanded bottom web 36 for support arm 16 adjacent curved diverging route D. On the other hand, if vehicle A diverges onto curved diverging route D, diversion arm slot 38 provides a passage through expanded bottom web 36 for the support arm 16 adjacent or nearest to the straight diverging route D. It will be noted that either support arm in passing through slots 37 and 38 in expanded web 36 serves to guide inwardly depending path rollers 18 so as to assure their central location on either side of channel 27 at channel continuation 34.

Each conveyed vehicle A is equipped with an attached switching apparatus B for selecting diverging routes D at junction C. Protruding outwardly and in front of support arms 16 in the direction of conveyance of vehicle A are guide arms 39. Each guide arm is attached to a support arm and extends on either side of monorail 25 so as to be immediately below the sides of bottom web 36. Each guide arm is formed with a recess for slideably engaging guides 40 and 41 therein. These guides in turn extend upwardly from alternating actuator 43 mounted to the top portion of cab 14. Actuator 43 is constructed so as to support in the elevated position either the continuation guides 40 or the diversion guides 41. When continuation guides 40 are in the supported elevated position, diversion guides 41 are retracted and similarly when diversion guides 41 are in the elevated position, continuation guides 40 are retracted.

In operation, switch apparatus E enables conveyed vehicle A to select either of the diverging routes D by the contact of guides 40 and 41 with either, but not both, of the expanded web surfaces 45 and 46. If upon approach to junction C vehicle A is programmed to select the straight diverging route D, atlernating actuator 43 will support continuation guide 40 in the elevated position retracting diversion guide 41. Continuation guide 40 in its slideable engagement interior of guide arm 39 will elevate and contact continuation web surfaces 45 on that side of expanding web 36 which is away from curve diverging route D. As vehicle A proceeds in the direction of conveyance, continuation guide 40 will follow continuation surface 45. This following will align guide arm 39 parallel to the straight diverging route B and in turn pivot support arm 16 about pivot 48 in the top portion of cab 14. Path rollers 18 will follow the course directed by the continuation guide and pass over expanded web 36 onto the straight diverging route D. That support adjacent the curved diverging route D will pass through continuation slot 37 preventing during its passage any derailment of path rollers 18 through the opening in central channel 27. The foward roller of conveyed vehicle A will thus choose the straight diverging route D in a constant and safeguarded suspension from supporting path B.

Alternately, if vehicle A is programmed to choose curved diverging route D, alternating actuator will elevate diversion guides 41 and retract continuation guides 40. The elevated diversion guide will contact diversion surface 46 on that side of monorail 25 furthest removed from the straight diverging route D, guiding support arm 16 and path rollers 18 over expanded path 36 to the selected route. The supported arm opposite diversion guide 41 will pass through diversion slot 38 serving to both support the conveyed vehicle A and guide path rollers 18 in their support along expanded bottom web 36. Rollers 18 and their support arms 16 will be permitted to turn so as to conform to the curved diverging routes D by means of pivot mounting 48 in the top portion of cab 14. As is apparent, the disclosed switching apparatus is adaptable to accommodate curved diverging routes on one or both of the available paths leading from junction C.

The conveyed vehicle and supporting path have thus far been illustrated as an overhead monorail having dependingly supported vehicles traveling thereon. The switching mechanism has been illustrated as having all moving parts attached to the conveyed vehicles. It is believed apparent that the apparatus for selectively routing each conveyed vehicle and the apparatus for spacing multiple conveyed vehicles along the supporting path which is hereinafter described, can be applied to more conventional conveyors and railway systems.

With specific reference to FIGS. 2 and 3, sensing transducer F and designation apparatus G are illustrated. Transducer F includes a reading head 49 having two parallel rows of normally open induction relays 52 and 53 together with a proximity sensing relay 54. These relays designated F–0 through F–5 in first row 52, F–00 through F–50 in row 53 and proximity sensing relay FX are normally opened. Top selector $H_1$ and bottom selector $H_2$ are positioned to form a series circuit between a selected relay in first row 52 and a selected relay in second row 53 respectively and in cooperation with proximity sensing relay FX read coded information on designation apparatus G attached to selective points along the supporting path when the reading head 49 of sensing apparatus F is in registry with the designation apparatus G.

Designation apparatus G, illustrated in FIG. 2 as attached to the supporting path B and enclosed within boundary 57 of the schematic sketch of FIG. 3, contains essentially a first row 59 of magnet recesses G–0 through G–5, a second row 60 of magnet recesses G–00 through G–50 and a proximity magnet GX. These magnet recesses are displayed from the supporting path in a disposition where the passing reading head 49 of transducer F may sense magnets M selectively placed in some of the recesses. As is apparent, the recesses of designation apparatus G form a mirror image of the induction actuated relays of reading head 49 so that the magnets in any or all of the recesses may be identified by the passing relays.

The operation of sensing transducer F in cooperation with designation apparatus G may best be understood with reference to FIG. 4. FIG. 4 illustrates a 36 station supporting path having station S–00 through S–55 attached thereto. Supporting path B is schematically represented by line 61 interconnecting the respective stations. As illustrated in FIG. 4a, each station has a path diversion 62 leading to its terminal 63 and a path return 64 reconnecting the station to the supporting path. Specific designators 52 are located along the supporting path B immediately before each path diversion 62 so as to actuate switch apparatus E through sensing apparatus F in order to obtain a timely diversion of conveyed vehicle A at any preselected station.

It will be noted that supporting path B as schematically illustrated in FIG. 4 is divided into six parallel rows of stations or routes sequentially designated R–0, R–1, R–2, R–3, R–4 and R–5. A conveyed vehicle traverses each route in the direction of conveyance arrow 68 and can be diverted to the respective routes at junctions C–1, C–2, C–3 and C–4.

With further reference to FIG. 4, each station is illustrated by a schematic representation of its specific indicia 66. Each specific indicia 66 is divided into two parallel rows 70 and 72. These rows have six sequential spaces therein, each space indicating a possible position for the placement of a magnet M. Row 70 contains route identifiers 71 shown in route R–0 as solid dots occupying the first sequential space in row 70 for all stations on route R–0, the second sequential space in all stations on route R–1, the third sequential space on all stations on route R–2 and similarly progresses in routes R–3, R–4 and R–5. Row 72 contains similar emitters or magnets M occupying advancing spaces with each sequential station located along the designated routes. Station 00 has a station identifier 73 located in the first space, station S–01 has an emitter in the second space, station S–02 has an emitter in the third space with a similar progression in station S–03, S–04 and S–05.

Referring back to FIGS. 2 and 3, the selective actuation of sensing transducer F may be illustrated. Transducer F comprises a power supply 75 connected in series with induction actuated normally opened relays F–0 through F–5 in first row 52, induction actuator normally opened relays F–00 through F–50 in second row 53 and proximity relay FX completing the circuit in power connection 77 to diversion actuator 78. Selection of the particular station is made by positioning the conductive arms 80 so as to make possible a completed series circuit between power supply 75, one of the relays in first row 52, one of the relays in second row 53, and the proximity sensing relay 54. If, for example, the indicia of station S–05 is desired to be selected, top selector $H_1$ would have its conductive arm 80 rotated about selector pivot 81 to electrically communicate with relay F–5 through selector contact H–5 while lower selector $H_2$ would have its conductive arm 80 rotated about pivot 81 to electrically communicated with relay F–00.

Assuming conveyed vehicle A was traveling in the vicinity of station S–00 on route R–0 in the direction of conveyance arrow 68 and a stop at the terminal of station S–05 was desired, the selector would be correctly positioned as illustrated above. As reading head 49 passes each of the specific indicia schematically illustrated in FIG. 4, various induction relays would close and open but in each of the stations F–00 through F–04, the proper relay combination to complete the series circuit would not be present. When the conveyed vehicle A reached the proximity of the specific designation apparatus G located adjacent station S–05, the series circuit would be completed. Electrical power would flow through the circuit from power supply 75 to diversion actuator 78 of alternating actuator 43 elevating diversion guide 41 as schematically illustrated in FIG. 3. The diversion guide would switch or divert the conveyed vehicle to the path diversion 62 and terminal 63 of station S–05.

Assuming that a completed stop has been made at station S–05 and it is desired to return conveyed vehicle A to the main path, the vehicle would return onto supporting path B via path return 64. It will be remembered, however, that diversion guide 41 is in the elevated position and in such a position would select route R–1 which may or may not be desired. To prevent this, a continuation actuator 84 is electrically communicated in a series circuit with power supply 75 and relay FY illustrated schematically in FIG. 3. When the conveyed vehicle A passes any proximity identifier, occupying the position of magnet GX illustrated in FIG. 3 relay FX will close supplying power to continuation actuator 84 which in turn would elevate continuation guide 40. To prevent this circuit from being completed when the series circuit to diversion actuator 78 has been triggered upon the identification of a selected indicia, an induction actuated normally closed relay 85 is located in the circuit to continuation actuator 84 and actuated by current flowing to the diversion actuators 78 the circuit to continuation actuator 84 is interrupted by the opening of normally closed relay 85 preventing the opposition of continuation actuator 84 against diversion actuator 78.

It will be noted that in traveling between station S–00 and station S–05, conveyed vehicle A traveled a route R–0 comprising a traverse of the station S–01, S–02, S–03 and S–04. As is apparent, once conveyed vehicle A and its sensing transducer are located along any one of routes R–0, R–1, R–2, R–3, R–4 or R–5, it is capable of selecting any predesignated station. In the conveyance through the supporting path, however, it will be necessary to have the vehicle A discriminate between the available routes as well as the individual stations along each route. To accomplish this purpose, there is located at junctions C bulk designators 86 which are programmed to co-act with the sensing apparatus F so as to cooperatively select a route including any desiganted station along the supporting path.

Bulk designators 86 are located throughout supporting path B at those places where alternate routes become available to the conveyed vehicle. The designators 86 have indicia imprinted thereon which includes the specific designation of all stations which may be reached by diverting at their respective junctions. The bulk designator 86 adjacent junction C–1 of route R–1 includes all of the indicia or magnetic configuration of station S–00 through S-05 and S-10 through S-15. The bulk designator at junction C-3 includes the specific designation or indicia of stations S-00 through S-05, S-10 through S-15, S-20 through S-25 and S-30 through S-35. Similarly, the bulk designator at junction C-4 includes the specific indicia of stations S-40 through S-45 and S-50 through S-55 while the bulk designator at junction C-2 includes the same information but additionally has the indicia of stations S-20 through S-25 and S-30 through S-35.

Assume a passenger entering a vehicle at station S-00 wishes to traverse supporting path B to station S-22. Sensing apparatus F would be actuated through selector H to program a series circuit including relays F-2 and F-20 in FIG. 3. The conveyed vehicle would traverse through R-0 encountering bulk designator 86 at junction C-1. Since the bulk designator C-1 would not include the specific indicia of the intended destination, station S-22, vehicle A would not divert at route R-1 but would continue on the supporting path to junctions C-3. At junction C-3, bulk designator 86 would includes the indicia of station S-22 completing the circuit between power supply 50 and power connector 55 diverting vehicle A as hereinbefore described. Alternating actuator 43 would elevate diversion guide 41 routing vehicle down path R-3 in the direction of station S-35. Upon reaching the specific designator 66 of station S-35, continuation actuator 84 will be energized elevating continuation guide 40 and retracting diversion guide 41 permitting the conveyed vehicle to traverse route R-3. On route R-3, conveyed vehicle A and its sensing transducer will not identify any of the indicia thereon, but will proceed into junction C-2 located at the termination of route R-3. Similar to its encounter at junctions C-3, sensing transducer F will identify the specific indicia of station S-22 on the bulk designator 86 of junction C-2. The conveyed vehicle will divert along route R-2 continuing its course through station S-20, finally diverting at its destination S-22.

As should be apparent upon examination of the disclosed supporting path and conveyed vehicle, any station along supporting path B is available from any other point along the conveyor network. Furthermore, bulk designators 86 have an additional advantage which may not readily be apparent. It will be noted from the description of a bulk designator 86 that the indicia thereon includes all routes which may be reached along a shortest available route along supporting path B by diverting at the respective junction C adjacent the particular bulk designator. The disclosed conveyor system may have its bulk designation apparatus supplied with information necessary to designate the shortest available route to a conveyed vehicle A available along supporting path B in the direction of conveyance arrow 68.

It may be desired to program selectors H so as to return each conveyed vehicle to a preselected station along supporting path B when the vehicles are not otherwise in use. This will assure each station of the periodic presence of a vehicle for the loading of passengers.

Sensing apparatus F and designation apparatus G have been described utilizing magnets M and induction actuator relay F. As is apparent, alternate emitters and transducers may be substituted utilizing such other transmittive media as mechanical conact, radio frequencies, light, sound and the like.

As illustrated thus far, the conveyed vehicle has switched to the designated stations of a 36 station conveyor system. As is apparent, the number of stations, the supporting path, the designation apparatus and the transducer may be varied so as to meet any desired configuration of pre-existing streets, pathways and destinations. Further, the conveyed vehicle has been illustrated as stopping at the individual stations in the vicinity of terminals 63. It is believed apparent that the conveyed vehicle could otherwise identify with the selected stations by having sensing transducer F interconnect with mechanism which would stop the conveyed vehicle on the main supporting path or alternately, actuate the vehicle for picking up and depositing articles at the identified station.

With specific reference to FIGS. 5, 6 and 7, an apparatus for preventing collision or other undesired contact of vehicles along the supporting path B is specifically illustrated. As has previously been explained, a supporting path B similar to the one illustrated schematically in FIG. 4 would commonly have multiple conveyed vehicles A traversing its circuit at random intervals. Such vehicles would collide when diverted to the same station or route and furthermore could converge from alternate routes so as to collide along supporting path B. To prevent this undesired result, a speed control mechanism J attached to each vehicle A communicates through conductive elements K located on control section L throughout supporting path B.

With specific reference to FIG. 5, speed control mechanism J is specificaly illustrated. Path roller 18 is shown powered by drive linkage 20 from drive motor 21. Drive motor 21 is typically a three-phased squirrel cage motor which is powdered by three-phased current from adjustable frequency power supply 90 which in turn receives its power from the three-phased power supply 92 attached to supporting path B along energized rails 93 located on one side of central channel 27. The conveyed vehicle A obtains power from rails 93 throughout supporting path B by means of slideable electrical connectors 95.

A three-phased current power supply 97 energized from rail 93 supplies control circuit 99 with direct current. Interior of control circuit 99 are full speed oscillator 101, slow speed oscillator 103 and shut off 105. Slow speed oscillator 103 and shut off 105 are actuated by ground signals from conductive elements K in slow speed row Z and stop row X respectively on supporting path B. Additionally, shut off 105 may be actuated by a stop signal from a terminal 63 so as to stop the conveyed vehicle approximate a destination. Full speed oscillator 101 receives its actuating signal typically from the passenger interior of the vehicle A.

Full speed oscillator 101, slow speed oscillator 103 and shut off 105 each electrically communicate with frequency control servomotor 111. Servomotor 111 drives pinion 112 which in turn rotates differential 114. Differential 114 is connected to shaft 115 of drive motor 21 on one side and to frequency generator 117 at actuating shaft 119. Frequency generator 117 rotates producing an electrical signal which controls the output of adjustable frequency power supply 90 determining the speed of drive motor 21.

Operation of speed control mechanism J is as follows. Assuming a conveyed vehicle A is in the stopped position adjacent the thermal and receives a start signal from a terminal 63, full speed oscillator 101 in control circuit 99 would be actuated. Oscillator 101 would supply power to frequency control servomotor 111 rotating pinion 112 at the desired speed of drive motor 21. As the vehicle A was in the stop position initially, there would be no motion imparted to drive motor 21 through path roller 18. Motor 111 would thus transmit its total rotation to actuator shaft 119 of differential 114 rotating frequency generator 117 at essentially full speed. Frequency generator 117 would output electrical signal to adjustable frequency power supply 90 activating silicon control rectifiers interior of the power supply 90 to supply electrical energy to drive motor 21. Drive motor 21 would commence to power path roller 18 through linkage 20 and simultaneously reduce the rotational output to actuator shaft 119 and frequency generator 117 adjusting the phase output of the silicon control rectifiers interior of the adjustable frequency power supply 90 as is common in the art. As is apparent, when drive motor 21 equals the rotational output of frequency control servomotor 111, frequency generator 117 will cease its acceleration signal to adjustable frequency power supply 90, maintaining path roller 18 and drive motor 21 at a constant speed.

Control circuit 99 has oscillators 101 and 103 and shut off 105 interconnecting so that if any single unit receives an actuating signal, the remaining units are de-energized or shut off. Full speed oscillator 101 is additionally wired so that if either slow speed oscillator 103 or shut off 105 are not receiving an actuating signal, oscillator 101 will operate powering the conveyed vehicle A at full speed as hereinbefore described.

Assuming vehicle A was traveling at full speed through the operation of full speed oscillator 101, an actuating signal to slow speed oscillator 103 from conductive element K in slow speed row Z would shut down full speed oscillator 101 simultaneously with the actuation of slow speed oscillator 103. Slow speed oscillator 103 will power frequency control servomotor 111 at a speed which is less than the rotational speed of drive motor 21. The reduction in speed of frequency control servomotor 111 will rotate actuator shaft 119 in the reverse direction of starting, sending an electrical impulse from frequency generator 117 which is the electrical reverse of the starting signal previously described. Adjustable frequency power supply 90 will reduce the power output to drive motor 21 in turn reducing the speed of conveyance of vehicle A along its supporting path. When drive motor 21 reaches the identical speed of frequency control servomotor 111 generator 117 will again reach the stationary position having adjusted power supply 90 to give drive motor 21 optimum power for maintaining the desired speed.

As is apparent, it may be necessary to control the acceleration and deceleration of the conveyed vehicle through speed control mechanism J to prevent unreasonable dynamic forces experienced in rapid speed change. Accordingly, an accelerometer P may be inserted in control circuit J to monitor the output of control circuit 99 to provide reasonable rates of speed change.

A stop signal received either from conductive element K in stop row Y on supporting path B or from a terminal will operate to completely stop frequency control servomotor 111. Motor 111 will cease to rotate transmitting the entire rotation of drive motor 21 through differential 114 to actuator shaft 119. Frequency generator 117 will transmit a stop signal to adjustable power supply 90 shutting off power to drive motor 21. As is apparent, frequency control servomotor 111 and frequency generator 117 rotational communicate through differential 114 to drive motor 21 to control the speed of conveyed vehicle A along supporting path B.

In addition to speed control mechanism J, each conveyed vehicle A has a ground communicator X attached thereto. As illustrated in FIG. 5, ground communicator comprises a connection to ground on the conveyed vehicle electrically communicated to conductive element K on proximity sensing row X on supporting path B.

Referring specifically to FIG. 6, a supporting path B is schematically illustrated having control section L-1 through L-10 sequentially laid out thereon. Three conductive elements K are laid out on each control section insulated from adjacent conductive elements K interior of the same control section. Conductive elements K on sequential control section L-1 through L-10 form proximity sensing row X, stop row Y and slow speed row Z. Conveyed vehicles traverse the illustrated section of supporting path B in the direction of conveyance arrow 68.

For convenience of reference and ease of understanding, each conductive element in FIG. 6 will be hereinafter referred to by the control section number or designation of that control section on which the conductive element K is located followed by the alphabetical designation of the particular row in which the element K is located. Using this system, the first or top conductive element K in row X would be referred to as L-1X whereas the last or bottom conductive element in section L-10 would be referred to as L-10Z.

It will be noted that conductive element L-10X is electrically communicated through conductor 122 with adjacent conductive element L-9Y and similarly, element L-9Y communicates with element L-8Z. Further examination of FIG. 6 will reveal the electrical communication of elements L-9X with L-8Y and L-7Z. As is apparent, the conductive elements K communicate in a similar progression throughout the length of supporting path B illustrated in FIG. 6.

Operation of the illustrated speed control mechanism J through conductive elements K on adjacent control sections L may be illustrated using the example of a conveyed vehicle on control section L-6 in the stop disposition being approached by the second conveyed vehicle on control section L-1 approaching at full speed. As previously described, ground communicator N on the first conveyed vehicle at control section L-6 will directly ground conductive element L-6X and indirectly ground through electrical conductors 122 conductive element L-5Y and L-4Z. The approaching conveyed vehicle upon reaching the beginning of section L-4 will receive a slow signal as its senses the ground potential of conductive element L-4Z. Upon detecting the slow signal, the conveyed vehicle will slow, as previously described, through speed control mechanism J. Upon reaching control section L-5, a stop signal will be received from conductive element L-5Y. Speed mechanism J will stop the second conveyed vehicle A short of a collision with the first conveyed vehicle.

When the conveyed vehicle in the position of control section L-6 continues in the direction of conveyance arrow 68 to the next sequentially adjacent control section L-7, its ground communicator N will transfer from conductive element L-6X to L-7X. The second conveyed or stopped vehicle on control section L-5 will no longer receive a stop signal from conductive element L-5Y but will rather receive a new slow signal from conductive element L-5Z. The second conveyed vehicle will thus commence to move at a slow speed as soon as the first conveyed vehicle moves from an adjoining control section to a normal course along the supporting path. When the first conveyed vehicle is more than two control sections ahead of the second conveyed vehicle, no proximity signal will be communicated between the vehicles through conductive elements K. As previously described, full speed oscillator 101 will actuate the second conveyed vehicle to full speed operation. The described progressions will continue throughout the control sections L on the supporting path B permitting sequentially conveyed vehicles to travel along common routes without collision.

With specific reference to FIG. 7, the disclosed conductive elements are shown adjacent a convergent point of interference 0 along supporting path B where two routes D-1 and D-2 converge. With reference to the section designation system previously described, it will be noted that the conductive elements along each of the routes are communicated by conductive elements 122 in similar progressions. For example, section L-8X electrically communicates with section L-7Y and L-6Z on both converging routes D-1 and D-2. Without reference to or inclusion of convergent point of interference 0, it is apparent that two conveyed vehicles traveling on either route D-1 or D-2 would avoid one another as described with reference to FIG. 6.

Assume, however, that two vehicles enter control section L-1 traveling in the direction of conveyance arrows 68, each of the vehicles being located on a respective routes D-1 and D-2. As is apparent, if the two vehicles were allowed to continue at approximately the same speed to the convergent point of interference 0, collision between the respectively conveyed vehicles could take place. This problem is alleviated by having inter-route conductors 124 communicate between selective conductive elements K on routes D-1 and D-2 respectively.

The particular communication of the conductive elements on each of the converging routes D-1 and D-2 illustrated in FIG. 7 is described by the following table:

COMMUNICATED ELEMENTS K

| Route D-1 | Route D-2 |
| --- | --- |
| L-1X | L-1Z' |
| L-2X | L-2Z' |
| L-3X | L-2Z' |
| L-4X | L-3Z' |
| L-5X | L-3Z' |
| L-6X | L-4Z' |
| L-7X | L-5Z' |
| L-8X | L-6Z' |
| L-9X | L-7Z' |
| L-10X | L-8Z' |

Assume for example that simultaneously conveyed vehicles on each of the respective routes D-1 and D-2 were traveling in the direction of conveyance arrows 68 in the vicinity of control section L-1. As element L-1X of route D-1 is electrically communicated via inter-route connector 124 to conductive element L-1Z' of route D-2, that vehicle on route D-2 will slow so as to permit the conveyed vehicle on route D-1 to reach point of interference 0 first. The same effect will take place when both vehicles are on their respective control sections L-2 at the same time. The respective control sections are spaced so when the vehicles have passed out of control sections L-1 and L-2, that vehicle proceeding on route D-1 will have advanced along the adjacent control sections by approximately one control section in the lead of that vehicle traveling on route D-2. When the vehicle on route D-1 reaches control section L-3 and L-4, the conveyed vehicle on route D-2 will then be located on control section L-3 and as conductive element L-3X and L-4X are in direct communication through inter-route conductor 124 with control section L-3Z' of route D-2, the vehicle on route D-2 will again receive a slow signal from the latter conductive element further slowing the vehicle on route D-2. Similarly, when the vehicle on route D-1 reaches control section L-5 and L-6, the electrical ground of conductive elements L-5X and L-6X will be communicated to conductive element L-4Z' on route D-2. The vehicle on route D-2 will sense a slow signal on section L-4 from element L-4Z' or a stop signal on section L-5 from element L-5Y thus further retarding its progress relative to the vehicle on route D-1. It will be noted that from section L-6 through the point of interference 0, the preference of the conveyed vehicle on route D-1 is continued in an unchanged progression so that when either vehicle arrives at a point of interference 0, a special interval similar to that maintained for two vehicles in closing proximity along a common route will be maintained. Collision at point of interference 0 will thus be avoided.

The intercommunication of the control sections L between the converging routes D-1 and D-2 has been specifically illustrated for two vehicles on a collision course to point of interference 0, which is the worst possible condition of collision which can exist along the supporting path B. It is believed that the reader may readily observe that course between simultaneously conveyed and converging vehicles at dispositions where proximity between the conveyed vehicles become dangerously close will be corrected by the disclosed circuitry in accordance with the same principles illustrated in the above specific references. Where that vehicle on route D-2 is ahead of that vehicle on route D-1 by at least two control sections, no correction will be communicated by the disclosed circuitry. Where the vehicle on route D-2 is less than two control sections ahead of the vehicles on route D-1, a sequence of stop or slow signals will be received by the conveyed vehicle on converging route D-2 so as to arrest its progress and permit the conveyed vehicle on route D-1 to pass point of interference 0 first.

It will be noted, that the conductive elements K and the communicating conductors 122 and 124 attached to the supporting path B all communicate with one another in essentially unrestricted electrical communication and have no relays or other mechanisms attached to the supporting path which can fail in service. Further, the disclosed speed control mechanism is not integrated with the power supply to the conveyed vehicle permitting normal electrical service to the vehicle at all times during its disposition whether stopped or moving, on supporting path B.

As is apparent, the present apparatus can be adapted to control the relative speeds of two vehicles approaching point of interference along the supporting path which merely comprises a crossing rather than the illustrated converging of two routes to a single common route on the supporting path.

The foregoing conveyor system has been illustrated as specifically adapted to the transport of human passengers through a metropolitan area. It is believed apparent that this system could be adapted to any other conveyor network requiring multiple stations with multiple routes therebetween. Although the foregoing invention has been described in some detail by way of illustration and example for purposes of clarity and understanding it is understood that certain changes and modifications may be practiced within the spirit of the invention.

What is claimed is:

1. A conveyor system for the selected transport of a conveyed vehicle from any place on a supporting path to a given point located on said supporting path, said system comprising: a supporting path having a plurality of available routes to said given point; a conveyed vehicle transportable along said supporting path; mutually co-acting switching means attached to said conveyed vehicle and to the junctions of available routes along said supporting path for selection of a designated one of said available routes including mutually co-acting sensing means for designating one of said available routes; said mutually co-acting sensing means including first indicia means identifying said point and second indicia means proximate said junctions identifying those available routes to said point with said second indicia means including in a unitary system said first indicia means identifying said point; said mutually co-acting sensing means selectively distinguishing said first indicia means identifying said point from said second indicia means as said conveyed vehicle is proximate said junctions and designating those available routes including said point to said switching means whereby said conveyed vehicle is transportable along a route including said point.

2. A conveyor system according to claim 1 and wherein: said supporting path includes a plurality of closed loops providing an endless path for said conveyed vehicle.

3. A conveyor system according to claim 1 and wherein: said conveyed vehicle is transported along each of said available routes in a preselected one way direction.

4. A conveyor system according to claim 2 and wherein: said mutually co-acting switching means includes an alternating actuator attached to said conveyed vehicle for diverting said vehicle at said designated routes.

5. A conveyor system according to claim 1 and wherein: said sensing means can be selectively activated from said vehicle.

6. A conveyor system for the transport of a vehicle from any place on a supporting path to a selected station on said path along a designated route, said system comprising: a supporting path including a plurality of stations located thereon; said supporting path further including a plurality of available routes interconnecting said stations; a conveyed vehicle transportable along said supporting path; first mutually co-acting sensing apparatus attached to said conveyed vehicle and said supporting path for selectively identifying to said conveyed vehicle said selected station from said plurality of stations; said first mutually co-acting sensing apparatus including first indicia means for specifically distinguishing each of said stations from all remaining stations when said conveyed vehicle is proximate said selected station; mutually co-acting switching means attached to said conveyed vehicle and said supporting path for selecting a designated route and including second mutually co-acting sensing means for designating to said switching means a route to said selected stations; said second mutually co-acting sensing means including second indicia means including the first indicia means of all stations on said available route; said second mutually co-acting sensing means selectively distinguishing said first indicia means identifying said station from said second indicia means as said conveyed vehicle is proximate said junctions and designating to said switching means those available routes including said selected station whereby said conveyed vehicle is transported along a designated route to said station for identification with said station.

7. A conveyor system according to claim and 6 wherein: said bulk designation means further has second indicia including the first indicia of all points along said supporting path which may be reached by way of a shortest available traverse of said supporting path which includes said one of said routes.

8. In a conveyor system wherein a mutually co-acting selection apparatus is capable of selecting a station from a plurality of stations and selecting a route to said station from a plurality of routes to said station, said system comprising: a plurality of available routes along a supporting path interconnecting a plurality of stations; specific designation means attached to said supporting path proximate said stations for displaying specific indicia distinguishing each of said stations from said remaining stations; bulk designation means located at junctions of available routes for identifying one of said available routes; said bulk designation means displaying generic indicia designating one of said available routes including the indicia of all stations along said designated route; a conveyed vehicle transportable along said supporting path having said mutually co-acting selection apparatus attached thereto; said mutually co-acting selection apparatus including means for selectively distinguishing one of said specific indicia identifying a selected station from all remaining indicia of said system; mutually co-acting switching means attached to said supporting path and said vehicle for selecting designated routes along said supporting path; said mutually co-acting selection apparatus cooperatively connected to said mutually co-acting switching means for designating a route at said junctions from said bulk designation means; said mutually co-acting selection apparatus cooperating with said bulk designation means to designate those available routes identified by generic indicia including said one of said specific indicia identifying said selected station; said mutually co-acting selection apparatus further cooperating with said specific designation means proximate said selected station to identify said station to said vehicle.

9. In a conveyor system according to claim 8 and wherein: said designation means includes a plurality of emitters affixed to said supporting path as selected intervals in preselected varied geometric configuration defining a transmitting station; said mutually co-acting selection apparatus includes a plurality of transducers affixed to said conveyed vehicle so as to pass in actuating proximity to emitters defining a receiving station; said transducers having a mirror image geometric configuration which includes all of said varied geometric configuration of said emitters; and means for individually actuating said transducers for cooperating identification with some of said emitters.

10. In a conveyor system according to claim 9 and wherein: said emitters are magnets and said transducers include electromagnetic induction apparatus.

References Cited

UNITED STATES PATENTS

| | | | |
|---|---|---|---|
| 980,643 | 1/1911 | Jackson | 104—28 |
| 2,084,879 | 6/1937 | Weise | 246—31 |
| 2,194,057 | 3/1940 | Simpson | 104—26 |
| 3,171,362 | 3/1965 | Noye | 104—88 |
| 3,214,003 | 10/1965 | Wilson | 198—38 |
| 3,263,625 | 8/1966 | Midis | 104—88 |

ARTHUR L. LA POINT, *Primary Examiner.*

D. F. WORTH, III, *Assistant Examiner.*